United States Patent Office 3,793,379
Patented Feb. 19, 1974

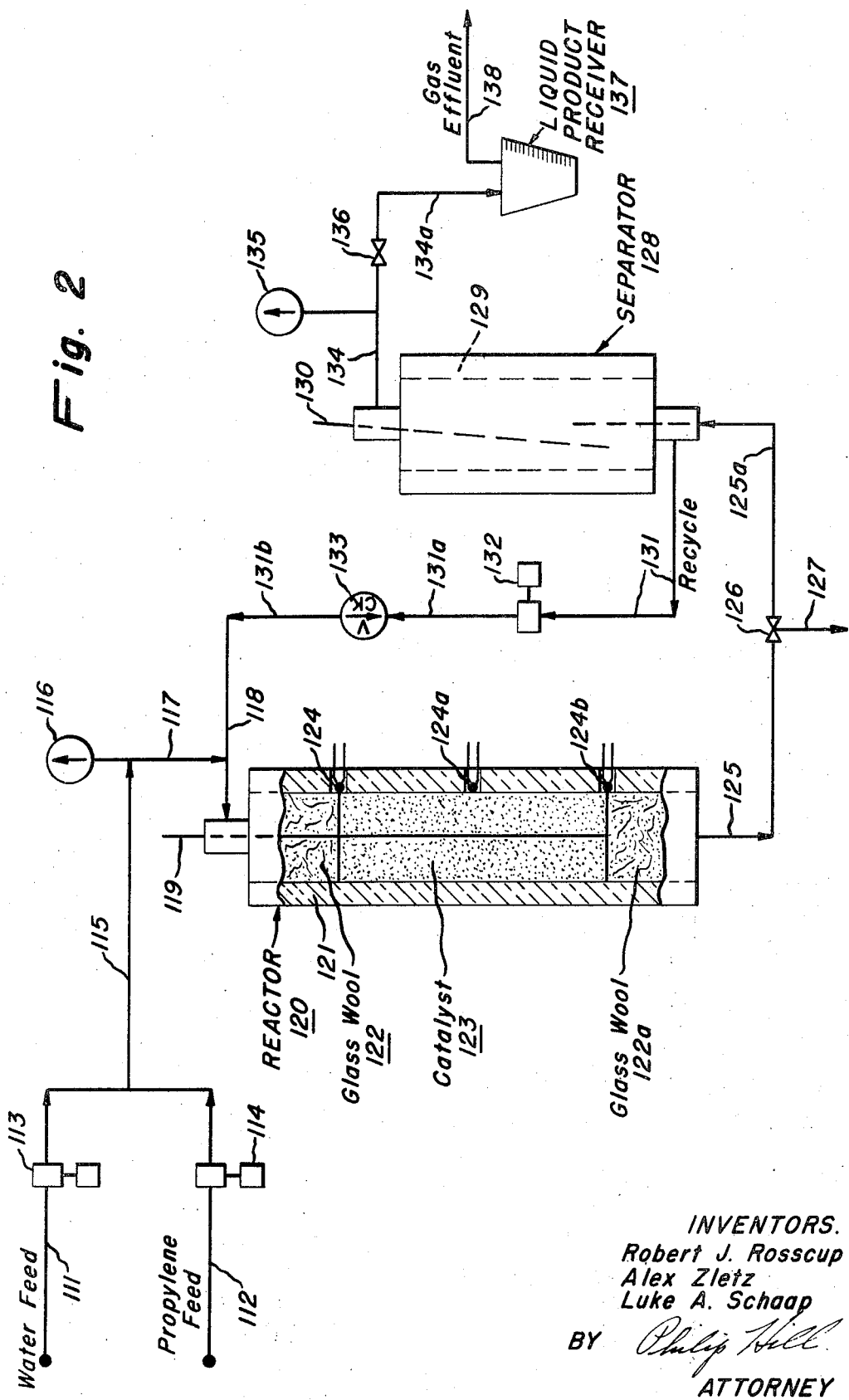

3,793,379
PROCESS FOR THE PRODUCTION OF ALCOHOLS
Robert J. Rosscup, Valparaiso, Ind., and Alex Zletz, Chicago Heights, and Luke A. Schaap, South Holland, Ill., assignors to Standard Oil Company, Chicago, Ill.
Continuation-in-part of abandoned application Ser. No. 561,776, June 30, 1966. This application Apr. 24, 1970, Ser. No. 31,599
The portion of the term of the patent subsequent to Dec. 15, 1987, has been disclaimed
Int. Cl. C07c 29/04
U.S. Cl. 260—641
5 Claims

ABSTRACT OF THE DISCLOSURE

Production of $C_2$ and $C_3$ alcohols from corresponding olefins is effected by liquid-phase high-pressure hydration with recovery of the reaction product by introducing a separating agent in order to form a water-rich phase and an organic-rich phase. The water-rich phase is recycled under high pressure conditions.

This application is a continuation-in-part of application Ser. No. 561,776, filed June 30, 1966, and now abandoned.

BACKGROUND OF THE INVENTION

Direct catalytic hydration of olefins to the corresponding alcohols has been shown to have advantages over indirect hydration. However, the alcohol is dilute because excess water must be fed with the olefin to the reactor to prevent polymerization on the catalyst and to favor more complete conversion of olefin. Furthermore, olefin is not completely converted because equilibrium limits the extent of reaction. The effluent from the reactor therefore contains alcohol, olefin and large amounts of water.

Various methods have been used to remove the water from the effluent to produce an alcohol concentrate. Many of these prior methods have involved separation of the water from the alcohol and disposition of the water. This is undesirable because: the water often contains some alcohol and therefore disposition of such water is costly in that desired product is being wasted; expensive and time-consuming steps are performed at ambient or near-ambient pressures to isolate as much of the alcohol from the water as possible; and in high-pressure reactions it is expensive to recycle unconverted water after fractionating the product at ambient pressure, due to the large expenditures of compression energy. In addition, large quantities of water feed are necessary for the reaction if such a recycling step is not done. The foregoing prior processes possess many disadvantages which make them unattractive for commercial operation.

While unconverted olefin hydrocarbons alone will usually extract the higher alcohols from the aqueous phase, these are usually not present in sufficient amount to remove the lower alcohols from the water. The water-alcohol ratio may also be too great for the olefin to effectively extract the alcohol. Separation of a water-lower alcohol mixture is exceptionally difficult in a commercial operation employing high-temperature and high-pressure conditions due to the high degree of miscibility of the two liquids.

SUMMARY OF THE INVENTION

This invention relates to a process for the production of $C_2$ and $C_3$ alcohols from the corresponding olefin hydrocarbons, and more particularly to an improved mode of carrying out such a process. Still more particularly, this invention relates to an improved process for separating the lower alcohols by use of a separating agent. This addition of a separating agent provides an excellent means for separating alcohol-water mixtures and is effective in recovering alcohol from the dilute alcohol solutions.

The process of this invention comprises catalytically hydrating a liquid-phase water-$C_2$ to $C_3$ olefin hydrocarbon mixture in a reaction zone under high pressure conditions, introducing a separating agent to form a water-rich phase and an organic-rich phase, and recycling, under the high pressure conditions, the water-rich phase back into the catalytic zone along with the water or olefin feeds. Separating agent may be injected into either the feed to or the effluent from the high-pressure direct-hydration conversion of olefin hydrocarbons. The separating agent may be either a liquid extractant or a salt for use in "salting out" one of two miscible liquids. The separating agent may also be a combination of these; for example, an ether and a salt such as sodium chloride.

The effluent stream may be cooled by heat exchange and sent to a separator, with substantially no reduction in pressure, where the reaction product separates into two phases. The upper phase contains the unconverted olefin and any extractant present together with nearly all of the alcohol and a small amount of water. The lower phase contains water, any salt present, and a small amount of alcohol. The lower water-rich phase is removed and recycled to the reactor while the alcohol-rich phase is depressured and the components purified as, for example, by fractionating. The extractant may be recovered either as an azeotrope or in essentially pure form by distillation. The recovered extractant may be recycled to the reactor or to the separation zone, while unconverted olefin is recycled to the reactor and the alcohol is either used as such or further purified by conventional means. When the reactor feed contains alkane as well as olefin, the olefin-alkane mixture from the final separation is sent to a feed fractionating unit.

It may be desirable to make use of high-pressure adsorption prior to fractionation of the upper phase. This has the advantage of recovering the olefin at high pressure. If this is done, the upper phase is sent to a high-pressure adsorption tower to remove water, extractant, and alcohol from the olefin which is recycled to the reactor. The alcohol, extractant, and water are recovered from the adsorbent, together or separately, in stages by passing suitable desorbents through the tower, for example, hot flue gas or a hydrocarbon stream, or by evacuation of the adsorbents while heating.

DESCRIPTION OF THE DRAWINGS

In the accompanying drawings:
FIG. 2 is a schematic flow diagram illustrating a particular experimental set-up used in examples to be described later.

Figure 1:
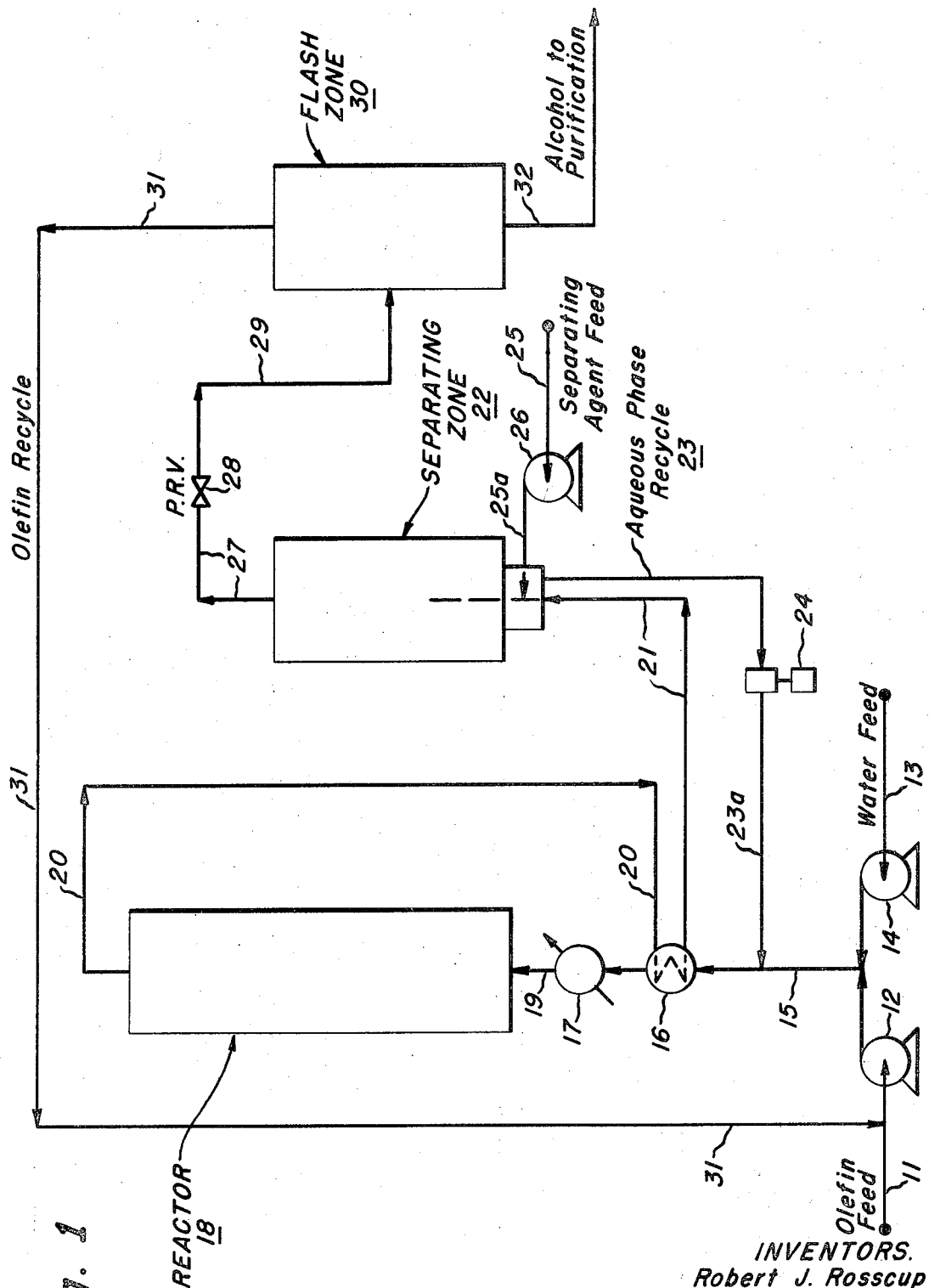
FIG. 1 is a schematic flow diagram illustrating, without limitation upon the reasonable scope of our invention, a particular embodiment of the invention.

One aspect of the present invention is specifically described with reference to FIG. 1. Olefin feed enters through line 11 and is compressed by means of high pressure pump 12. Water feed enters through line 13 and is compressed by means of high pressure pump 14. When a salt is used as a separating agent the water feed contains salt in solution. The olefin-water mixture is then passed through line 15 under pressure, through heat exchanger 16 and heater 17, so that the mixture will be at the desired temperature upon entering catalytic reactor 18 through line 19. After reaction the product is drawn off at the top of reactor 18 through line 20 and it is fed through heat exchanger 16 in order to cool the product. The product is then fed through line 21 to separating zone 22. Separating agent may be fed through line 25, pump 26 and line 25a into the reaction product by line 21.

The product separates into two phases in separating zone 22. The lower aqueous phase is drawn off at the bottom of separator 22 through line 23 and recycled to line 15 by means of recycle pump 24 and line 23a. The upper organic phase is drawn off at the top of separator 22 through line 27 and depressured by means of pressure release valve 28. The depressured product is fed by line 29 to olefin flash zone 30, where the unconverted olefin is recovered and recycled by line 31 back to olefin feed line 11. Prior to recycle any extractant separating agent contained in this stream may be separated by conventional means (not shown) and recycled through line 25. The remaining portion of the organic phase, i.e., the alcohol-rich portion, is drawn off at the bottom of olefin flash zone 30 through line 32 and fed to a purification zone (not shown) where the alcohol may be purified by conventional means such as distillation, adsorption or extraction. If a liquid extractant separation agent has been employed it may be recovered from the alcohol stream and recycled through line 25.

DESCRIPTION OF THE PREFERRED EMBODIMENTS

Our process comprises contacting, in a catalytic zone, a wholly liquid-phase water-olefin mixture at a temperature in the range from 200° to 675° F. and a pressure in the range from 2,000 to 100,000 pounds per square inch, with a suitable catalyst, introducing a separating agent into the reaction product, separating the resulting alcohol-rich phase from the water-rich phase in a separation zone, purifying the alcohol in the alcohol-rich phase, and recycling the water-rich phase to the catalytic zone.

A preferred mode of operation is as follows: a liquid-phase mixture of $C_2$ to $C_3$ olefin and water, in a mole ratio ranging from 0.25 to 25 moles water per mole olefin, advantageously between 1 and 15 moles water per mole olefin, is contacted with a solid catalyst at a temperature in the range of 200° to 675° F., advantageously 250° to 550° F., and a pressure in the range of 2,000 to 100,000 p.s.i.g. Suitable catalysts include: silica-alumina, preferably comprising 10 to 30 percent alumina and 90 to 70 percent silica by weight in substantially uniform composition; silica-magnesia; acidic clays; reduced tungsten oxides; and acidic organic ion exchange resins, such as Amberlyst 15 (polystyrene divinyl benzene sulfonic acid resin). The hydration reaction may be carried out at a weight hourly space velocity (WHSV) of 0.1 to 20, preferably 0.25 to 5.0, expressed as parts of water-olefin mixture per part of catalyst. The reaction product is then removed from the catalytic zone, while maintaining the reaction pressure. Separating agent, in the form of an extractant, preferably diethyl ether or diisopropyl ether, is then introduced into the reaction product which then passes to a separation zone. The separation zone is maintained at reaction pressure and at a temperature which may be in the range from ambient to reaction temperature. This temperature is advantageously below reaction temperature and preferably below 300° F. In the separation zone the products form an upper organic-rich phase and a lower aqueous-rich phase and the lower phase is recycled to the catalytic zone with the application of sufficient heat to reach reaction temperature. The upper phase is drawn off, depressured to a gauge pressure in the range of 0 to 50 atmospheres, preferably 1 to 10 atmospheres, and transferred to a flash zone which may be a simple distillation column or a flash drum. This is done to remove unconverted olefin which may be present in the product and to recover the olefin for compressing, heating and recycling to the catalytic zone. The extractant and alcohol are drawn off from the bottom of the flash zone. After separation by conventional means from the alcohol, the extractant is compressed and recycled to its point of introduction into the effluent. The remaining product alcohol may be used as such for further purified conventionally, as, for example, by distillation, adsorption, extraction and the like.

The use of salts in salting out the alcohol has the advantage of not requiring re-pressurization since it is possible to recycle directly from the separation zone. The salt may be any sufficiently water-soluble ionic salt; for example, potassium chloride, potassium nitrate, ammonium nitrate, magnesium sulfate, sodium bromide, sodium chloride, etc. Such water-soluble ionic salts should be employed in sufficient amount to provide a salt concentration in the range from 10 to 20 wt. percent in the water phase present in the reactor.

The extractant when used, should be one in which the alcohol is highly soluble and the water substantially insoluble; e.g., di-alkyl ethers, thioethers, etc. The quantity of extractant added to the reactor effluent depends on the water-to-olefin ratio used at the start and the level of conversion achieved. Depending upon the quantity of unconverted olefin, the ratio of extractant: total feed may be in the range of 1:5 to 1:100 parts by weight.

It is desirable that the depressurization of the upper phase after removal from the separation zone be as limited as possible. In other words, it is preferred to maintain the upper phase at the highest pressure permitting unconverted olefin to flash off and subsequent separation of extractant from alcohol product. This is desirable since the olefin should be recycled and introduced into the catalytic zone at the high pressure originally required in the reaction. The limitation then on the uppermost limit of the pressure will be related to the particular olefin used.

In performing the process of this invention it may be desirable that the separation zone not be removed from the reaction zone; i.e., the reaction zone may comprise a catalytic zone and a separation zone. If such a system is used, alcohol may be drawn off and purified. It is usually advantageous however, to provide a separation zone which is removed from the catalytic or reaction zone.

Compositions of the phases in the separator must be distinguished from the compositions of product that appears after flashing the olefin. If insufficient organic layer is formed in the separation zone for the rate of withdrawal, aqueous phase will also be removed and the concentration of alcohol in the flash drum bottoms will be low. Operating parameters need to be carefully adjusted to achieve operation such that sufficient organic phase is formed so that no aqueous phase is removed. Make-up water, water recycle, olefin feed rate, total space velocity, nature and quantity of separating agent and product withdrawal control both conversion to alcohol and ratio of phases formed in the separator for a given pressure, temperature and catalyst. If the ratio of make-up water, recycle water and space velocity are too great for the amount of olefin pumped, a small amount of organic phase will be formed and aqueous layer may also be withdrawn and collected with the organic layer. If insufficient water is pumped to compensate for that consumed in making alcohol and if the ratio of olefin pumped is high, the total aqueous phase will decrease in volume and the amount of organic phase will increase and build up in the separation zone. By carefully adjusting separating agent feed rate or concentration, it is possible to optimize product and withdrawal rate by compensating for any unbalance in the other feeds.

The separator temperature is also an important factor. The choice of temperature will depend upon the critical conditions for the particular olefin feed. Generally, the higher temperature leads to a decrease in alcohol-to-water ratio, i.e., selectivity for alcohol in the organic phase and, hence as low a temperature as feasible should be used.

Flow direction in the reactor system may affect composition in the reactor during the run and, consequently, the product composition. But for the most part, the effect of flow direction on the alcohol-to-water ratio or on production rate is small. Therefore, either up-flow or down-flow operation may be used in the process of this invention.

EXAMPLES

The following runs, exemplary of our invention, are presented. They are not intended to impose any limitation upon the reasonable scope of the invention.

An experimental arrangement as shown in FIG. 2 was used. Water and polymerization grade propylene feed entered through lines 111 and 112 respectively. The water contained salt in solution where present (as shown in the table). When extractant was used it was introduced with the propylene feed. High pressure pumps 113 and 114 were used to provide the necessary high pressure conditions for the feed. The water and propylene mixture was then passed through line 115 under pressure. The pressure was measured by high pressure gauge 116. The mixture then passed by lines 117 and 118 into reactor 120. The reactor had a 200-milliliter capacity, was constructed of stainless steel, and was provided with heater jacket 121 controlled by thermo-couples 124, 124a, and 124b. Temperatures in the reactor were measured by thermo-couples in the thermo-couple well 119. The reactor was filled by placing glass wool 122a at the bottom (5 inches) followed by catalyst 123 (13 inches) and then placing glass wool 122 (1.5 inches) onto the catalyst. The catalyst was silica-alumina containing 25 wt. percent alumina, ground and sieved to 20–40 mesh size.

Separator 128 was a 100-milliliter stainless steel vessel electrically heated by heater jacket 129. Temperatures were measured by thermo-couples in thermo-couple well 130. The effluent was passed through line 125, valve 126 and line 125a to enter separator 128 about ⅓ of the distance upward from the bottom of the separator. A recycle stream was withdrawn from the bottom of the separator through line 131. A diaphragm-type pump 132 was used for recycling. The recycle stream was then passed through line 131a, provided with check valve 133, and through line 131b where it was fed back into line 118 and hence into reactor 120. The product from the separator passed overhead through line 134, provided with pressure gauge 135, and through pressure release valve 136. By means of line 134a, the depressured product was passed into calibrated centrifuge tube 137 which served as the liquid product receiver, while the gas effluent passed to a wet test meter (not shown) by means of line 138.

The runs of these examples were started with the reactor solution containing isopropyl alcohol (IPA) to permit rapid approach to steady state composition. Heat was applied to the reactor and the recycle pump 132 started. While raising the temperature the pressure was kept at 2,000 p.s.i.g. Upon reaching about 400° F. reactor temperature the feed pumps 113 and 114, previously brought to the reactor preactor pressure, were started. The pressure was then permitted to rise to the operating pressure of about 6,750 p.s.i.g. at a reaction temperature of about 485° F. After temperature and pressure had stabilized, product cuts were taken every half hour.

Each run was terminated by turning off heaters and pumps and isolating the reactor. The reactor was depressured to 4,000 p.s.i.g. and an air stream was employed to cool the reactor rapidly. Depressuring was continued through valve 136 to 0 p.s.i.g. gauge pressure and the reactor was drained. The product was drained off at the bottom of reactor 120 through line 125 and fed to separator 128 through line 125a. The reactor could also be drained through line 125, drain valve 126 and line 127. The catalyst was removed from the reactor, heated to 100° C. under vacuum, and the product was collected in a trap cooled in liquid nitrogen. Gas chromatographic analyses were made on all recovered liquid products.

Operation with salt and/or extractant present in the reactor is shown in the table. The product collected in the receiver during the course of a run varied: salt solution came off first, then two liquid phases began to appear with a small amount of alcohol-rich layer. This upper layer increased in amount while the lower water-rich phase was obtained in the product receiver. Once this condition was achieved it continued until the run was ended.

In the case of diisopropyl ether (DIPE), the extractant is also involved in the reaction when hydrating propylene. Although the complete separation is made at a temperature different than that of the reaction, the introduction of the ether into the reactor feed helped to establish equilibrium sooner than when it is absent, because some diisopropyl ether is produced in the conversion reaction.

The use of salt appeared to reduce polymer formation during the hydration reaction. This is beneficial in that less olefin is lost to by-product formation.

The following table presents the results of runs performed with the above mentioned process arrangement in hydrating propylene to isopropyl alcohol. The table also includes comparison runs employing a reactor having a reactor having an integral separation zone.

TABLE.—HYDRATION OF PROPYLENE

|  | Catalytic zone and separation zone within reactor | | Separation zone separate from catalytic zone | | | | | | | |
|---|---|---|---|---|---|---|---|---|---|---|
|  | | | Up flow | | | Down flow | | | | |
| Catalyst, silica-alumina, g | 60 | 60 | 72.6 | 60 | 60 | 60 | 60 | 60 | 60 | 60 |
| Temperature, °F.: | | | | | | | | | | |
| Reactor | 500 | 500 | 490 | 490 | 490 | 500 | 480 | 485 | 490 | 488 | 490 |
| Separator | 290 | 280 | 180 | 368 | 178 | 180 | 176 | 177 | 177 | 180 | 177 |
| WHSV: | | | | | | | | | | |
| Propylene | 0.28 | 0.28 | 0.36 | 0.28 | 0.28 | 0.28 | 0.28 | 0.28 | 0.27 | 0.29 |
| DIPE | 0.012 | 0.012 | 0.015 | 0.012 | 0.012 | 0.012 | 0.012 | 0.012 | 0.027 | 0 |
| Water | 0.060 | 0.060 | 0 | 0.034 | 0 | 0.034 | 0.034 | 0.034 | 0.034 | 0.034 |
| Propylene rate, moles/hr | 0.406 | 0.030 | 0.612 | 0.017 | 0.401 | 0.401 | 0.402 | 0.402 | 0.383 | 0.417 |
| Water recycle rate, cc./hr |  |  | 70 | 70 | 70 | 70 | 170 | 170 | 170 | 170 |
| Reactor solution: | | | | | | | | | | |
| NaCl conc., wt. percent | 12.2 | 12.8 | 12.8 | 12.2 | 0 | 12.2 | 12.2 | 0 | 0 | 12.2 |
| IPA conc., wt. percent | 6.53 | 6.95 | 5.32 | 6.54 | 6.42 | 6.63 | 6.63 | 6.63 | 6.35 | 6.63 |
| DIPE balance: | | | | | | | | | | |
| Moles produced | 0.048 | 0.045 | 0.034 | 0.054 | 0.125 | 0.112 | 0.103 | 0.075 | 0.092 | 0.073 |
| Moles pumped | 0.048 | 0.075 | 0.075 | 0.045 | 0.041 | 0.049 | 0.051 | 0.052 | 0.164 | 0 |
| Conversion C₃H₆ to IPA, percent on total run | 26 | 23 |  | 16 | 24 | 24 | 20 | 25 | 20 | 15 |
| Conversion C₃H₆ to IPA plus DIPE, percent |  | 24 | 11 | 12 | 18 | 33 | 28 | 28 | 25 | 33 | 29 |
| Recovery of C₃H₆, percent on total | 89 | 94 |  | 82 | 88 | 96 | 92 | 88 | 86 | 85 |
| Product withdrawal, average cc./hr. (1 atm.) | 7 | 10 | 11 | 8 | 7 | 5 | 6 | 9 | 12 | 15 |

We claim:
1. In a process for the production of ethyl or isopropyl alcohols by catalytic hydration of the corresponding ethylene or propylene olefin hydrocarbon, wherein there is fed into a catalytic hydration zone a liquid-phase mixture of water and ethylene or propylene, said mixture containing 0.25 to 25 moles water per mole olefin and hydration is effected in said catalytic zone, in the presence of a solid hydration catalyst comprising silica and alumina, the alumina being present in an amount in the range from 10 to 30 wt. percent, at a temperature in the range from 200° to 675° F., a pressure in the range from 2,000 to 1,000,000 p.s.i.g. and a weight hourly space velocity in the range from 0.1 to 20, the improvement comprising the steps of:

(a) introducing a water-soluble ionic salt, selected from the group consisting of potassium chloride, potasium nitrate, ammonium nitrate, magnesium sulfate, sodium bromide, and sodium chloride, into the water feed to the catalytic hydration zone in an amount sufficient to maintain in the hydration zone a water phase having a salt concentration within the range from 10 to 20 wt. percent;

(b) separating the effluent from the catalytic zone, without depressuring, into an alcohol-rich liquid phase and and a water-rich liquid phase;

(c) recycling the water-rich phase to the catalytic hydration zone; and (d) recovering product alcohol from the alcohol-rich phase.

2. The process of claim 1 wherein the separation of phases is effected in a separation zone maintained at a pressure substantially the same as the pressure maintained in the catalytic zone and at a temperature no greater than the temperature maintained in the catalytic zone.

3. The process of claim 2 wherein the water-soluble ionic salt is sodium chloride.

4. The process of claim 1 wherein the olefin is ethylene and the alcohol product is ethyl alcohol.

5. The process of claim 1 wherein the olefin is propylene and the alcohol product is isopropyl alcohol.

References Cited

UNITED STATES PATENTS

| 3,548,013 | 12/1970 | Rosseup et al. | 260—641 |
| 2,042,212 | 5/1936 | Deanesly | 260—641 |
| 2,534,259 | 12/1950 | Gee et al. | 260—643 D |
| 2,687,439 | 8/1954 | Garner et al. | 260—643 D |
| 3,548,013 | 12/1970 | Rosseup et al. | 260—641 |

FOREIGN PATENTS

| 310,623 | 5/1929 | Great Britain | 260—643 D |

JOSEPH E. EVANS, Primary Examiner

U.S. Cl. X.R.

260—614 A, 643 D

UNITED STATES PATENT OFFICE
CERTIFICATE OF CORRECTION

Patent No. 3,793,379　　　　　　　　　Dated Feb. 19, 1974

Inventor(s) Robert J. Rosscup, Alex Zletz & Luke A. Schaap

It is certified that error appears in the above-identified patent and that said Letters Patent are hereby corrected as shown below:

Col. 3, line 75, "for" should be --or--.
　　4　　　　63　"product" should be --production--.
　　6　　　　22　after "water-rich" and before "phase" the following
　　　　　　　　　omitted: --layer decreased in successive samples
　　　　　　　　　　　　　　until finally only the alcohol-rich--.
　　6　　　　39　"a reactor having" is repeated.
　　5 & 6　　Table, "Moles Produced" and corresponding figures across
　　　　　　　　　page not italicized.
　　6　　　　　Table, under "Up Flow" starting with 72.6 and opposite
　　　　　　　　　"NaCl.conc.,wt.%", "12.8" should be --12.3--.
　　6　　　　72　"1000,000" should be --100,000--.
　　7　　　　9　"and" repeated.

Signed and sealed this 6th day of August 1974.

(SEAL)
Attest:

McCOY M. GIBSON, JR.　　　　　　C. MARSHALL DANN
Attesting Officer　　　　　　　　Commissioner of Patents